United States Patent [19]
Akiyama et al.

[11] Patent Number: 6,029,523
[45] Date of Patent: Feb. 29, 2000

[54] PRESSURE SENSOR

[75] Inventors: Yukiharu Akiyama; Hisato Umemaru, both of Tokyo, Japan

[73] Assignee: Mitsubishi Denki Kabushiki Kaisha, Tokyo, Japan

[21] Appl. No.: 09/201,841

[22] Filed: Dec. 1, 1998

[30]     Foreign Application Priority Data

Jun. 1, 1998 [JP] Japan .................................. 10-151696

[51] Int. Cl.⁷ ...................................................... G01L 7/00
[52] U.S. Cl. .............................................................. 73/706
[58] Field of Search ........................ 73/706, 714, 40.5 R, 73/37, 864.62; 340/605

[56]              References Cited

U.S. PATENT DOCUMENTS 4,866,989  9/1989  Lawless ..................... 73/756
5,375,472  12/1994  Mitani et al. ............... 73/706

FOREIGN PATENT DOCUMENTS 5-312661  11/1993  Japan .

*Primary Examiner*—William Oen
*Attorney, Agent, or Firm*—Sughrue, Mion, Zinn Macpeak & Seas, PLLC

[57]              ABSTRACT

To suppress the projection of an O ring when a plurality of O rings fitted onto a pipe are inserted into the respective O ring storage chambers of a cup, first and second O ring storage chambers corresponding to the plurality of O rings are formed in the cup, and the line diameter of an O ring which is inserted later is made larger than the line diameter of the O ring which is first inserted.

6 Claims, 5 Drawing Sheets

PRESSURE SENSOR

BACKGROUND OF THE INVENTION

1. Field of the Invention

The present invention relates to a pressure sensor and, particularly, to a shielding structure for preventing a pressure leak in a pressure introduction portion.

2. Description of the Prior Art

FIG. 7 is a partial sectional view of a conventional pressure sensor 20 disclosed by Japanese Laid-open Patent Application No. 5-312661, for example. This conventional pressure sensor 20 has a shielding structure used for the measurement of the pressure of fuel, mainly gasoline, or fuel vapor for an internal combustion engine. In FIG. 7, reference numeral 1 denotes a pressure sensitive element for detecting pressure by the piezoresistance effect of a resistor on a thin film silicon chip formed like a bridge. Reference numeral 2 represents a substrate for mounting the pressure sensitive element 1 and electric parts such as an unshown amplifier circuit and compensator circuit. Reference numerals 3 and 4 indicate O rings for shielding pressure P in a lower part of the figure so that it does not leak into portions therearound when the pressure P is transmitted to the pressure sensitive element 1 through a nipple 5. The O ring 3 made from a fluorine-based material having excellent gasoline resistance is used on the side of a medium to be detected for its pressure whereas the O ring 4 made from a silicon-based or, phlorosilicon-based material is used to ensure shielding properties at low temperatures at which the shielding properties of a fluorine-based material is inferior. Denoted by 6 is a filter for removing dust contained in the pressure P, 7 a base and 8 a cover. Reference numeral 9 denotes a connector, projecting from the base 7, for receiving power from an unshown computer, supplying it to the pressure sensitive element 1, the amplifier circuit and the compensator circuit, and applying an output signal in accordance with the pressure P to the computer from the pressure sensitive element 1 through the amplifier circuit and the compensator circuit. Reference numeral 10 indicates a cup connected to a recessed portion 11 located right below the pressure sensitive element 1 and projecting from the base 7 at a peripheral portion in contact with the base 7 to prevent the breakage of a shield after it is installed in the recessed portion 11 with the filter 6 interposed therebetween and having an O ring storage chamber 12 which is open at the top and a through hole 13 connected to a bottom portion of the O ring storage chamber 12. Reference numeral 14 denotes a pipe welded to guide the pressure P to the pressure sensitive element 1, and 15 a holder located on the substrate 2 side of the holder 14 to prevent the projection of the O rings 3 and 4.

A case where a shielding structure consisting of the O rings 3 and 4 is set between the cup 10 and the pipe 14, both forming a pressure introduction portion, will be described. When the cover 8 is not placed upon the base 7, the O rings 3 and 4 are fitted onto the pipe 14, which projects downward from the holder 15 below the substrate 2 mounting the pressure sensitive element 1, the amplifier circuit and the compensator circuit, in parallel to each other in an axial direction. The pipe 14 is then inserted into the through hole 13 from the 0 ring storage chamber 12 of the cup 10 installed on the base 7, whereby the O rings 3 and 4 are inserted in such a manner that they are pressed by the holder 15 and elastically deformed between the outer peripheral surface of the pipe 14 and the inner peripheral surface of the O ring storage chamber 12. Thereafter, the substrate 2 mounting the pressure sensitive element 1 and electric parts and parts such as the O rings 3 and 4, the filter 6, the cup 10, the pipe 14 and the holder 15 are stored in internal space 16 formed hermetically by combining the base 7 and the cover 8 together.

A description is subsequently given of the operation of the pressure sensor. The pressure p is transmitted from the nipple 5 to the pressure sensitive element 1 through the filter 6 where dust is removed and the pipe 14. At this point, the pressure P is precisely transmitted to the pressure sensitive element 1 by the action of the O rings 3 and 4 without leaking into the internal space 16 from the gap between the cup 10 and the pipe 14. While the pressure sensitive element 1, the amplifier circuit and the compensator circuit receive operation power from the computer through the connector 9, an output signal calculated by the amplifier circuit and the compensator circuit in accordance with the pressure P detected by the pressure sensitive element 1 is applied to the computer from the connector 9.

As the shielding structure of the conventional pressure sensor 20 is constructed as described above, the hardness of the O rings may be restricted by the characteristic properties of the materials of the O rings from the relationship between them and the medium to be detected for its pressure. For example, if the O ring 3 has a hardness of 20 (JIS Hs) or more, as shown in FIG. 8, there is a case where the O ring 4 receives stress from the O ring 3 and the holder 15 and projects from the gap between the O ring storage chamber 12 and the holder 15 when the pipe 10 fitted with the O rings 3 and 4 is inserted into the cup 10. If the O ring 4 projects, a projecting portion 17 of the O ring 4 is inserted between the cup 10 and the holder 15.

SUMMARY OF THE INVENTION

It is an object of the present invention which has been made to solve the above problem to provide a pressure sensor which can suppress the projection of the O ring by changing the shape of one element out of the O rings, the pipe and the cup when the O rings fitted onto the pipe are inserted into the cup.

According to a first aspect of the present invention, there is provided a pressure sensor in which a pipe fitted with a plurality of O rings arranged in parallel to each other in an axial direction is inserted into a through hole formed in a bottom portion of O ring storage chambers from the O ring storage chambers formed in a cup which forms a pressure introduction portion with the pipe so that the plurality of O rings are inserted in such a manner that they are elastically deformed between the outer peripheral surface of the pipe and the inner peripheral surfaces of the respective O ring storage chambers, wherein the line diameter of the O ring which is first inserted into the O ring storage chambers is made smaller than the line diameter of the O ring which is inserted later, the number of the O ring storage chambers corresponds to the plurality of O rings, the inner peripheral surfaces in contact with the O rings of the O ring storage chambers are interconnected by a stepped portion, and the stepped portion is located at a position where the O ring having a larger line diameter generates predetermined pressing force in the O ring storage chamber before the O ring having a smaller line diameter when the plurality of O rings fitted onto the pipe are inserted into the respective O ring storage chambers of the cup.

According to a second aspect of the present invention, there is provided a pressure sensor wherein the stepped portion has an inclined surface, having an inner diameter which decreases toward the insertion direction of the plurality of O rings, for smoothly interconnecting the inner peripheral surfaces of the plurality of O ring storage chambers.

According to a third aspect of the present invention, there is provided a pressure sensor in which a pipe fitted with a plurality of O rings arranged in parallel to each other in an axial direction is inserted into a through hole formed in a bottom portion of O ring storage chambers from the O ring storage chambers formed in a cup which forms a pressure introduction portion with the pipe so that the plurality of O rings are inserted in such a manner that they are elastically deformed between the outer peripheral surface of the pipe and the inner peripheral surfaces of the respective O ring storage chambers, wherein the inner diameter of the O ring which is inserted later into the cup is made larger than the inner diameter of the O ring which is first inserted, a large diameter O ring attachment portion is provided on the pipe, the O ring which is inserted later is fitted onto the large diameter O ring attachment portion, the O ring which is first inserted is fitted onto the pipe projecting from the large diameter O ring attachment portion, and the large diameter O ring attachment portion of the pipe presses the O ring which is first inserted when the plurality of O rings fitted onto the pipe are inserted into the respective O ring storage chambers of the cup.

According to a fourth aspect of the present invention, there is provided a pressure sensor wherein a ring-shaped flange member for separating the plurality of O rings from each other is provided on the pipe projecting from the large diameter O ring attachment portion and presses the O ring which is first inserted in place of the large diameter O ring attachment portion when the plurality of O rings are inserted into the respective O ring storage chambers of the cup.

According to a fifth aspect of the present invention, there is provided a pressure sensor in which a pipe fitted with a plurality of O rings arranged in parallel to each other in an axial direction is inserted into a through hole formed in a bottom portion of O ring storage chambers from the O ring storage chambers formed in a cup which forms a pressure introduction portion with the pipe so that the plurality of O rings are inserted in such a manner that they are elastically deformed between the outer peripheral surface of the pipe and the inner peripheral surfaces of the respective O ring storage chambers, wherein the pipe has grooves in which the respective O rings are fitted independently.

According to a sixth aspect of the present invention, there is provided a pressure sensor wherein the plurality of O rings of the first, third or fifth aspect of the present invention differ in hardness.

The above and other objects, advantages and features of the present invention will become more apparent from the following description when taken into conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
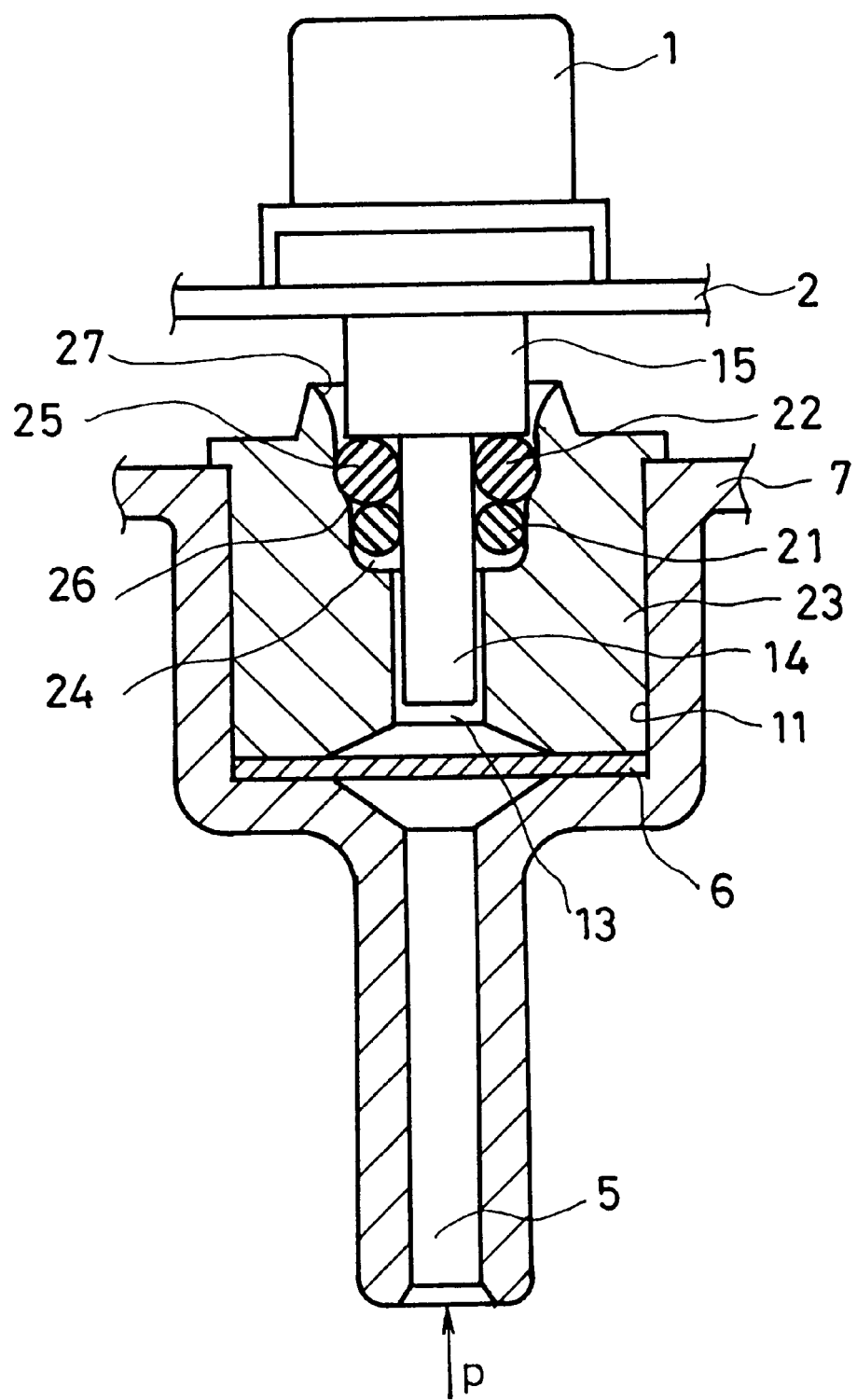
FIG. 1 is a longitudinal sectional view of a shielding structure after the assembly of a pressure sensor according to Embodiment 1 of the present invention.
Figure 2:
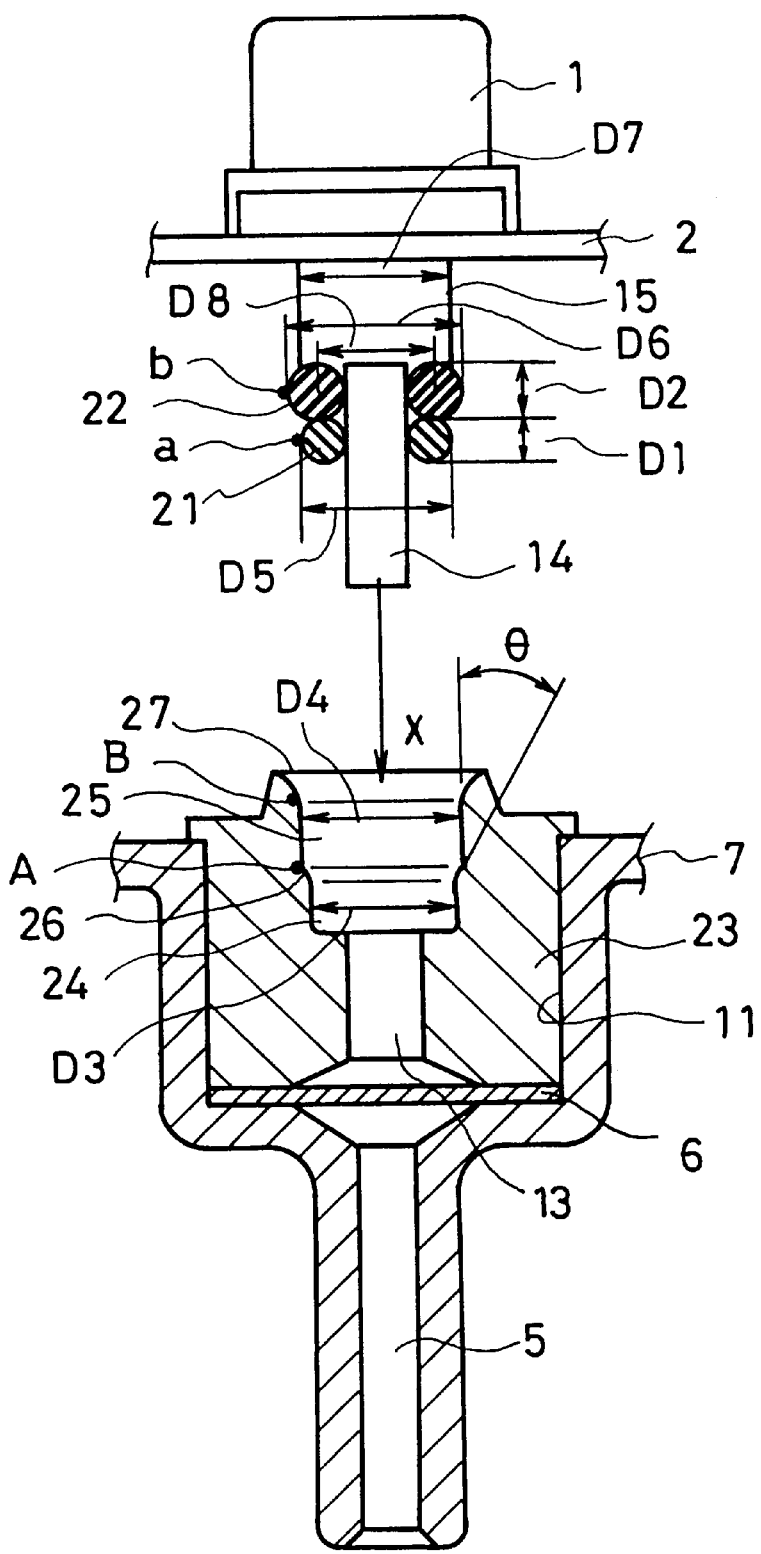
FIG. 2 is a longitudinal sectional view of a shielding structure before the assembly of the pressure sensor according to Embodiment 1.

FIG. 1 and FIG. 2 show Embodiment 1 of the present invention. FIG. 1 is a longitudinal sectional view of a shielding structure after assembly and FIG. 2 is a longitudinal sectional view of the shielding structure before assembly. In these figures, reference numeral 21 denotes an O ring made from a fluorine-based material, and 22 an O ring made from a silicon-based material. The line diameter D2 of the O ring 22 is made larger than the line diameter D1 of the O ring 21 (D1<D2). Reference numeral 23 represents a cup having a first O ring storage chamber 24 for the O ring 21 and a second O ring storage chamber 25 for the O ring 22. The first O ring storage chamber 24 and the second O ring storage chamber 25 are arranged concentrically and connected to each other in a vertical direction with a stepped portion 26 interposed therebetween. The inner periphery of the opening of the second O ring storage chamber 25 is formed as an arc guide surface 27 which spreads outward. Other constituent elements are the same as those of the prior art.

As shown in FIG. 2, in the case of this Embodiment 1, the hole diameter D4 of the second O ring storage chamber 25 is made larger than the hole diameter D3 of the first O ring storage chamber 24 (D4<D3). The hole diameter D3 of the first O ring storage chamber 24 is made smaller than the outer diameter D5 of the O ring 21 fitted onto the pipe 14 (D3<D5), and the hole diameter D4 of the second O ring storage chamber 25 is made smaller than the outer diameter D6 of the O ring 22 fitted onto the pipe 14 (D4<D6). A through hole 13 is formed in a bottom portion of the first O ring storage chamber 24. The outer diameter D7 of a holder 15 located on the substrate 2 side of the pipe 14 is made smaller than the hole diameter D4 of the second O ring storage chamber 25 and larger than the center diameter D8 of the O ring 22 fitted onto the pipe 14 (D4>D7 >D8).

By moving the substrate 2 including the pipe 14 having a portion projecting from the holder 15 and fitted with the O rings 21 and 22 in a direction shown by an arrow X, the O rings 21 and 22 are inserted into the first and second storage chambers 24 and 25 of the cup 23 independently, respectively. When the center in a vertical direction of the figure of the outer side of the O ring 21 which is first inserted (in the same direction as that shown by the arrow X) is represented by "a", the center in a vertical direction of the figure of the outer side of the O ring 22 which is inserted later by "b", a first position where the O ring 21 receives predetermined pressing force from the cup 23 in a horizontal direction of the figure (a connection portion between the second O ring storage chamber 25 and the stepped portion 26) by "A", and a second position where the O ring 22 receives predetermined pressing force from the cup 23 in a horizontal direction of the figure (a connection portion between the inner peripheral surface of the second O ring storage chamber 25 and the guide surface 27) by "B", these are set to such values that the center "b" of the O ring 22 reaches the second position "B" before the center "a" of the O ring 21 reaches the first position "A" at the time of inserting the pipe 14 into the cup 23.

The stepped portion 26 has a surface which is inclined at an angle of θ for connecting an inner peripheral surface forming interference with the O ring 21 of the first O ring storage chamber 24 and an inner peripheral surface forming interference with the O ring 22 of the second O ring storage chamber 25 smoothly. It is the best to set the inclination angle θ at 30° C. or lower.

According to the constitution of this Embodiment 1, to set the shielding structure consisting of the O rings 21 and 22 in the pressure introduction portion formed by the pipe 14 and the cup 23, as shown in FIG. 2, the O rings 21 and 22 are fitted onto a portion projecting from the holder 15 of the pipe 14 in parallel to each other in an axial direction. When the O rings 21 and 22 are fitted onto the pipe 14, they do not fall off from the pipe 14 because the inner diameters thereof expand outward and the restoring elasticity of the O rings 21 and 22 caused by the reaction of the expansion acts on the pipe 14. Thereafter, the pipe 14 is inserted into the cup 23, whereby the O rings 21 and 22 are inserted between the outer peripheral surface of the pipe 14 and the inner peripheral surfaces of the first and second O ring storage chambers 24 and 25, respectively, and elastically deformed as shown in FIG. 1.

Particularly, according to this Embodiment 1, since the dimensional relationships between the above centers "a" and "b" and the first and second positions "A" and "B" are set as shown in FIG. 2, when the pipe 14 fitted with the O rings 21 and 22 is inserted into the through hole 13 from the second and first O ring storage chambers 25 and 24 of the cup 23, the center "b" of the O ring 22 which is inserted later contacts the second position "B" before the center "a" of the O ring 21 which is first inserted contacts the first position "A". Thereby, the O ring 22 receives stress generated by predetermined pressing force before the O ring 21 receives stress generated by predetermined pressing force and is inserted into the second O ring-storage chamber 25. Therefore, when the center "b" of the O ring 22 contacts the second position "B" and receives stress generated by predetermined pressing force from the cup 23, the center "a" of the O ring 21 neither contacts the first position "A" yet nor receives stress generated by predetermined pressing force from the cup 23. As a result, the projection of the O ring 22 can be properly suppressed.

When the O ring 21 is inserted into the first O ring storage chamber 24 from the first position "A through the stepped portion 16, the O ring 22 does not project from the gap between the second O ring storage chamber 25 and the holder 15 even if it receives stress from the O ring 21 because it is already situated in a portion where the inner peripheral surface of the second O ring storage chamber 25 and the outer peripheral surface of the pipe 14 are opposite to each other and parallel to each other.

Since the stepped portion 26 interconnects the inner peripheral surfaces of the first and second O ring storage chambers 24 and 25 by a surface inclined at an angle of theta, the O ring 21 can be inserted smoothly from the second O ring storage chamber 25 to the first O ring storage chamber.

In this Embodiment 1, when the pipe fitted with the O rings 21 and 22 which are set on a projecting portion from the holder 15 in parallel to each other in an axial direction is inserted into the through hole 13 from the second and first O ring storage chambers 25 and 24 of the cup 23, the O ring 21 which is first inserted contacts the inner peripheral surface of the second O ring storage chamber 25 in a case and does not in another case, depending on the difference between the hole diameters (D4–D3) of the first and second O ring storage chambers 24 and 25.

Embodiment 2

Figure 3:
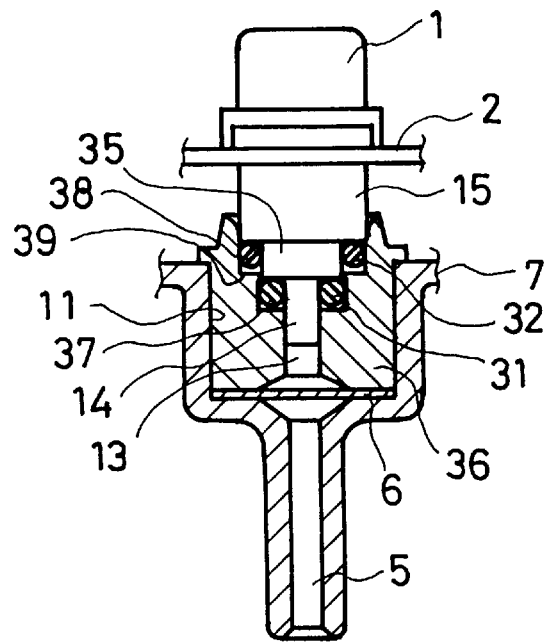
FIG. 3 is a longitudinal sectional view of a shielding structure after the assembly of a pressure sensor according to Embodiment 2 of the present invention.

FIG. 3 is a longitudinal sectional view of a shielding structure according to Embodiment 2 of the present invention in which O rings 31 and 32 correspond to the above O rings 21 and 22, respectively, and a cup 36 corresponds to the above cup 23. The inner diameter of the O ring 32 which is inserted later into the cup 36 is made larger than the inner diameter of the O ring 31 which is first inserted, and the pipe 14 has a large diameter O ring attachment portion 35 below the holder 15. When the pipe 14 is inserted into the through hole from the second O ring storage chamber 38 through the first O ring storage chamber 37 of the cup 36 while the O ring 32 is fitted onto the large diameter O ring attachment portion 35 and the O ring 31 is fitted onto the pipe 14 projecting from the large diameter O ring attachment portion 35, the large diameter O ring attachment portion 35 presses the O ring 31 and the holder 15 presses the O ring 32. That is, the O ring 31 and 32 are pressed by the large diameter O ring attachment portion 35 and the holder 15 independently, respectively, so that the O rings 31 and 32 do not contact each other, whereby the stress of the O ring 31 does not act on the O ring 32, thereby making it possible to properly suppress the projection of the O ring 32. The stepped portion 39 for interconnecting the inner peripheral surfaces of the first and second O ring storage chambers 37 and 38 of the cup 36 has a flat surface perpendicular to the insertion direction (the same direction as that shown by the arrow X in FIG. 2).

Embodiment 3

Figure 4:
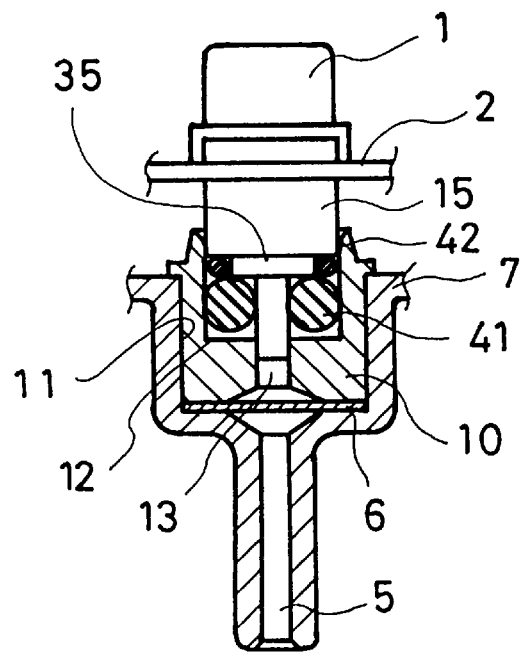
FIG. 4 is a longitudinal sectional view of a shielding structure after the assembly of a pressure sensor according to Embodiment 3 of the present invention.

FIG. 4 is a longitudinal sectional view of a shielding structure according to Embodiment 3 of the present invention in which O rings 41 and 42 correspond to the above O rings 21 and 22, respectively. Since the inner diameter of the O ring 42 which is inserted later into the cup 10 is made larger than the inner diameter of the O ring 41 which is first inserted, even when the cup 10 having no stepped portion on the inner peripheral surface of the O ring storage chamber 12 is used, the stress of the O ring 41 does not act on the O ring 42, thereby making it possible to suppress the projection of the O ring 42.

Embodiment 4

Figure 5:
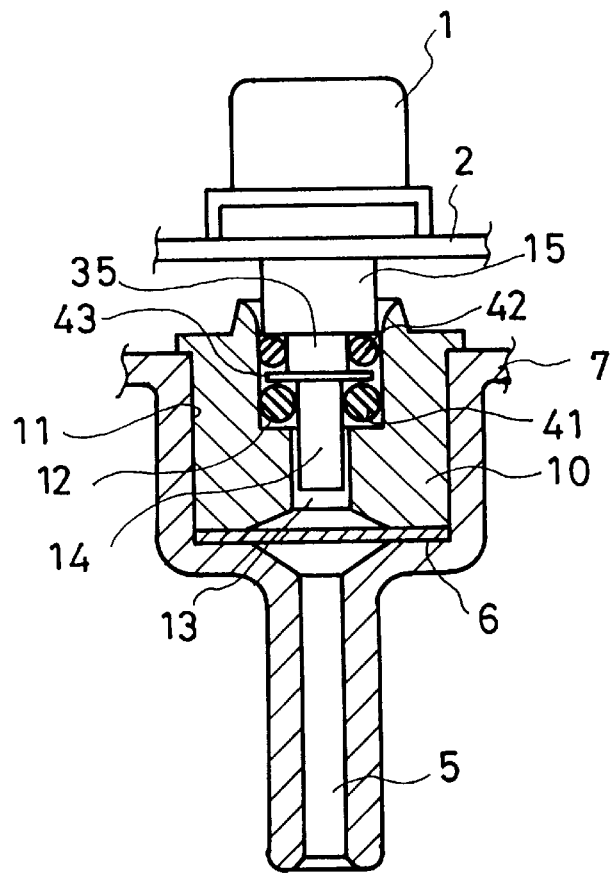
FIG. 5 is a longitudinal sectional view of a shielding structure after the assembly of a pressure sensor according to Embodiment 4 of the present invention.

FIG. 5 is a longitudinal sectional view of a shielding structure according to Embodiment 4 of the present invention. This Embodiment 4 has the effect of increasing the freedom of sizing the O rings 41 and 42, the pipe 14 and the large diameter O ring attachment portion 35 by providing a ring-shaped flange member 43 to the pipe 14 of the above Embodiment 3 shown in FIG. 4 below the large diameter O ring attachment portion 35. That is, in FIG. 4 showing the above Embodiment 3, if the level difference D does not satisfy the following expression to cause the O ring 41 to be pressed by the large diameter O ring attachment portion 35 when the line diameter of the O ring 41 is represented by "d" and the level difference between the large diameter O ring attachment portion 35 and the pipe 14 which is ½ the difference between the outer diameter of the large diameter O ring attachment portion 35 and the outer diameter of the pipe 14 is represented by "D", an upper portion of the O ring 41 projects from the large diameter O ring attachment portion 35, the stress of the O ring 41 is transmitted to the O ring 42 by contact between the O ring 41 and the O ring 42, and the O ring 42 projects from the gap between the O ring storage chamber 12 and the holder 15 at the time of insertion.

$$D > d/2 \quad (1)$$

In contrast to this, since the flange member 43 is used in FIG. 5, it prevents the O rings 41 and 42 from contacting each other directly and hence, the condition (1) is not necessary. Therefore, the freedom of sizing the O rings 41 and 42, the pipe 14 and the large diameter O ring attachment portion 35 can be increased.

Embodiment 5

Figure 6:
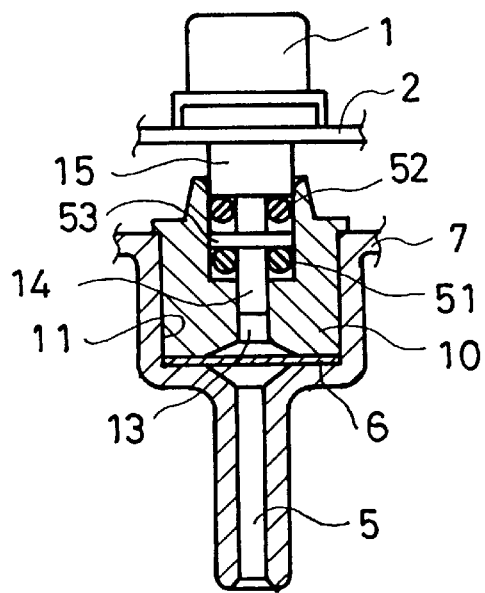
FIG. 6 is a longitudinal sectional view of a shielding structure after the assembly of a pressure sensor according to Embodiment 5 of the present invention.
Figure 7:
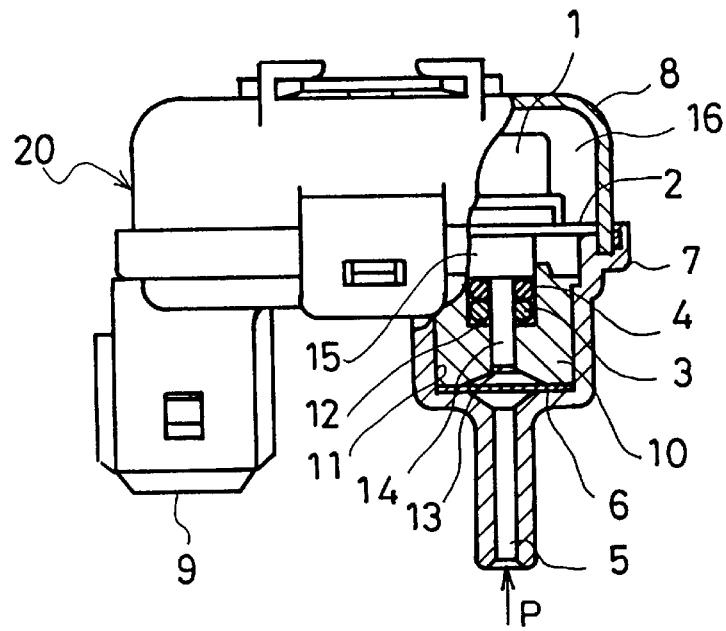
FIG. 7 is a side view partly broken away to show a pressure sensor of the prior art.
Figure 8:
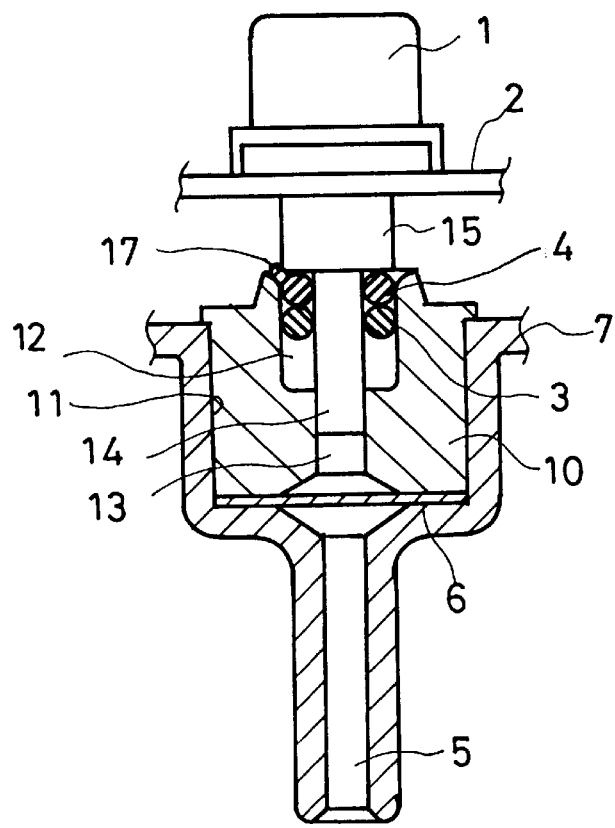
FIG. 8 is a longitudinal sectional view showing a defect in a shielding structure during the assembly of the pressure sensor of the prior art.

FIG. 6 is a longitudinal sectional view of a shielding structure according to Embodiment 5 of the present invention in which O rings 51 and 52 corresponding to the above O rings 21 and 22 have the same line diameter and the same inner diameter and the pipe 14 has the holder 15 and a flange member 53 around the pipe 14 and the flange member 53 is in the shape of a ring and is situated between the O rings 51 and 52. The O ring 52 is fitted in a groove formed by the holder 15, the flange member 53 and the pipe 14. Since the flange member 53 presses the O ring 51 when the pipe 14 is inserted into the through hole 13 from the O ring storage chamber 12 of the cup 10 while the O ring 51 is fitted onto the pipe 14 projecting from the flange member 53, the freedom of sizing the O rings 51 and 52 and the pipe 14 can be increased. The groove which the O ring 52 is fitted in is formed open on one side on the pipe 14 by the flange member 53 as shown in FIG. 6. Alternatively, the pipe 14 may comprise integrally another flange member, not shown, similar to the flange member 53 with a predetermined interval with the flange member 53, and a gap may be formed by this unshown flange member, the above flange member 53 and the pipe 14.

Embodiment 6

A plurality of the O rings 21, 22, 31, 32, 41, 42, 51 and 52 in the above Embodiments 1 to 5 may differ in hardness.

As described above, according to the above first to sixth aspects of the present invention, in a pressure sensor having a shielding structure consisting of a plurality of O rings in a pressure introduction portion formed by a pipe and a cup, by changing the shape of at least one element out of the O rings, the pipe and the cup, the projection of the O ring which is inserted later from the O ring storage chamber can be prevented, thereby making it possible to reduce a bad influence on assembly and increase the freedom of selecting the materials and characteristic properties such as hardness of the plurality of O rings when the plurality of O rings fitted onto the pipe are inserted into the cup and elastically deformed in the O ring storage chamber of the cup.

What is claimed is:

1. A pressure sensor in which a pipe fitted with a plurality of O rings arranged in parallel to each other in an axial direction is inserted into a through hole formed in a bottom portion of O ring storage chambers from the O ring storage chambers formed in a cup which forms a pressure introduction portion with the pipe so that the plurality of O rings are inserted in such a manner that they are elastically deformed between the outer peripheral surface of the pipe and the inner peripheral surfaces of the respective O ring storage chambers, wherein the line diameter of the O ring which is first inserted into the O ring storage chambers is made smaller than the line diameter of the O ring which is inserted later, the number of the O ring storage chambers corresponds to the plurality of O rings, the inner peripheral surfaces in contact with the O rings of the O ring storage chambers are interconnected by a stepped portion, and the stepped portion is located at a position where the O ring having a larger line diameter generates predetermined pressing force in the O ring storage chamber before the O ring having a smaller line diameter when the plurality of O rings fitted onto the pipe are inserted into the respective O ring storage chambers of the cup.

2. The pressure sensor of claim 1, wherein the stepped portion has an inclined surface, having an inner diameter which decreases toward the insertion direction of the plurality of O rings, for smoothly interconnecting the inner peripheral surfaces of the O ring storage chambers.

3. A pressure sensor in which a pipe fitted with a plurality of O rings arranged in parallel to each other in an axial direction is inserted into a through hole formed in a bottom portion of O ring storage chambers from the O ring storage chambers formed in a cup which forms a pressure introduction portion with the pipe so that the plurality of O rings are inserted in such a manner that they are elastically deformed between the outer peripheral surface of the pipe and the inner peripheral surfaces of the respective O ring storage chambers, wherein the inner diameter of the O ring which is inserted later into the cup is made larger than the inner diameter of the O ring which is first inserted, a large diameter O ring attachment portion is provided on the pipe, the O ring which is inserted later is fitted onto the large diameter O ring attachment portion, the O ring which is first inserted is fitted onto the pipe projecting from the large diameter O ring attachment portion, and the large diameter O ring attachment portion of the pipe presses the O ring which is first inserted when the plurality of O rings fitted onto the pipe are inserted into the respective O ring storage chambers of the cup.

4. The pressure sensor of claim 3, wherein a ring-shaped flange member for separating the plurality of O rings from each other is provided on the pipe projecting from the large diameter O ring attachment portion and presses the O ring which is first inserted in place of the large diameter O ring attachment portion when the plurality of O rings are inserted into the respective O ring storage chambers of the cup.

5. A pressure sensor in which a pipe fitted with a plurality of O rings arranged in parallel to each other in an axial direction is inserted into a through hole formed in a bottom portion of O ring storage chambers from the O ring storage chambers formed in a cup which forms a pressure introduction portion with the pipe so that the plurality of O rings are inserted in such a manner that they are elastically deformed between the outer peripheral surface of the pipe and the inner peripheral surfaces of the respective O ring storage chambers, wherein the pipe has grooves in which the respective O rings are fitted independently.

6. The pressure sensor of claims 1, wherein the plurality of O rings differ in hardness.

* * * * *